United States Patent [19]

Rose

[11] Patent Number: 4,585,370

[45] Date of Patent: Apr. 29, 1986

[54] RETAINING DEVICE FOR A PICK HEAD AND PICK EQUIPPED THEREWITH

[76] Inventor: Vernon F. Rose, P.O. Box 324, Providence Forge, Va. 23140

[21] Appl. No.: 728,034

[22] Filed: Apr. 29, 1985

[51] Int. Cl.$^4$ .......................... B25G 3/00; A01B 1/22
[52] U.S. Cl. .................................. 403/334; 403/374; 403/263; 30/308.1; 81/20
[58] Field of Search .............. 403/374, 334, 263, 368, 403/340, 232.1, 235; 30/308.1; 81/20

[56] References Cited

U.S. PATENT DOCUMENTS

| | | | |
|---|---|---|---|
| 90,412 | 5/1869 | Tyndale | 30/308.1 X |
| 210,703 | 12/1878 | Morrill | 30/308.1 X |
| 279,582 | 6/1883 | Morrill | 30/308.1 |
| 306,191 | 10/1884 | Trenor | 403/334 |
| 306,192 | 10/1884 | Trenor | 403/334 |
| 503,351 | 8/1893 | Morrill | 30/308.1 X |
| 911,374 | 2/1909 | Symonds | 403/374 X |
| 914,554 | 3/1909 | Cooley et al. | 30/308.1 X |
| 1,914,802 | 6/1933 | Cochrane | 403/334 |
| 2,095,156 | 10/1937 | Spark | 403/340 |
| 2,318,193 | 5/1943 | Branham . | |

FOREIGN PATENT DOCUMENTS 161396  4/1921  United Kingdom ............... 403/235

Primary Examiner—Cornelius J. Husar
Assistant Examiner—Todd G. Williams
Attorney, Agent, or Firm—Norman B. Rainer

[57] ABSTRACT

A retainer device is provided to prevent a pick head from sliding downwardly upon the wooden handle it is mounted upon. The device utilizes a thin bendable harness which wraps around the head and sides of the handle. Two shoulders are upraised from the upper surface of the harness and adapted to be outwardly oriented from the handle when the harness is wrapped around the handle. A pair of holding collars embrace the handle, engaging the shoulders. The pick head is positioned in abutment with the upper extremities of the collars.

7 Claims, 6 Drawing Figures

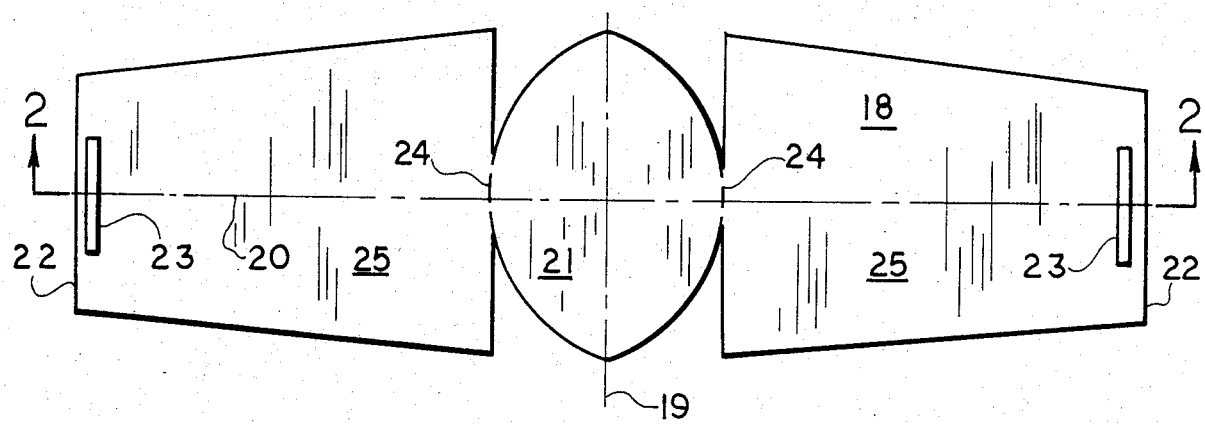
FIG. 1
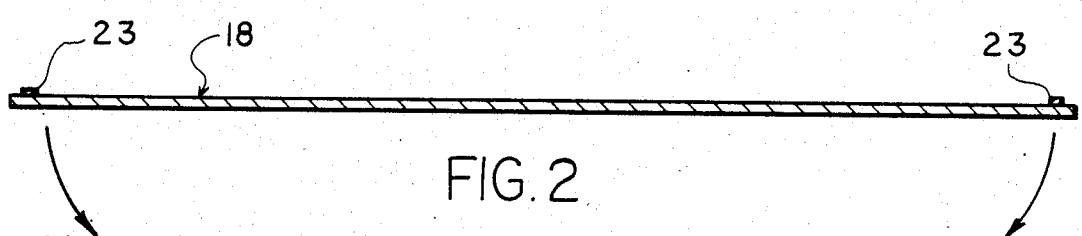
FIG. 2
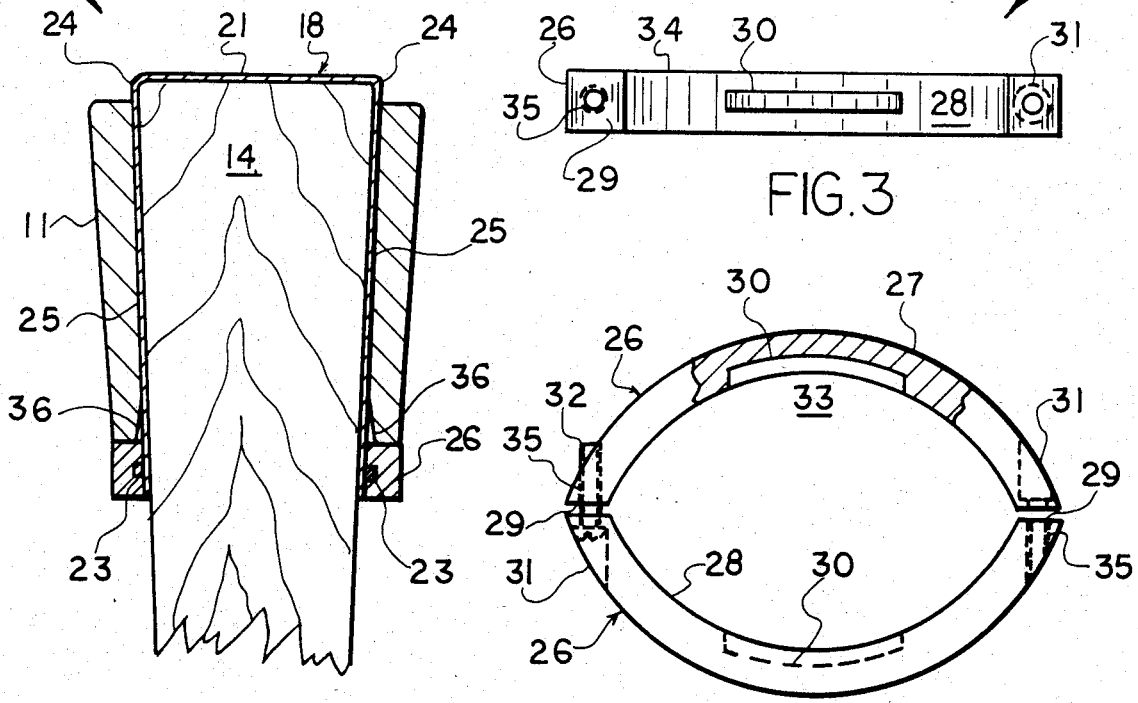
FIG. 2A
FIG. 3
FIG. 5

RETAINING DEVICE FOR A PICK HEAD AND PICK EQUIPPED THEREWITH

BACKGROUND OF THE INVENTION

This invention relates to picks, and more particularly concerns picks as generally utilized for working in soil and having a wooden handle whose head extremity is enlarged by an outward taper.

Picks which are in general use for manual digging and other manipulations of soil or other solid substrates are comprised of a wooden handle of about three foot length having a gripping portion of round or oval contour, and a head portion which tapers outwardly from the axis of the handle to an extremity having a cross-section which is considerably larger than the cross section of the handle portion. The pick head is a doubly pointed menber of monolithic construction, generally fabricated of cast iron, and having a tapered center socket adapted to engage the tapered head portion of the handle. Although the cooperative design of the handle and the head prevent the head from leaving the handle in the direction of the head portion of the handle, there is the frequent tendency for the head to become loose and slide down the handle onto the gripping portion thereof.

Various expedients have in the past been tried to prevent the pick head from sliding downward upon the handle, but such earlier efforts have either been ineffective or have involved expensive structures or designs incapable of enduring the harsh conditions of use experienced by the picks.

It is accordingly an object of the present invention to provide a device compatible with picks of current construction which will prevent the pick head from sliding onto the gripping portion of the handle of the pick.

It is another object of this invention to provide a device as in the foregoing object capable of easy installation onto a pick, and easy removal therefrom when necessary.

It is still another object of the invention to provide a device of the aforesaid nature which does not require modification of the pick head or handle.

It is a further object of the present invention to provide a device of the aforesaid nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by a retainer device adapted to be associated with a pick head positioned upon the outwardly tapered head portion of a wooden pick handle, said device comprising:

(a) an elongated thin bendable harness of integral monolithic construction having short and long axes of symmetry and two longitudinal extremities equally disposed about said short axis, said harness being adapted to lie in closely conforming contact with the head portion of said handle in a manner such that said longitudinal extremities are in facing disposition on opposite sides of the handle, (b) retaining shoulders disposed upon the same surface of said harness adjacent said longitudinal extremities, whereby said shoulders are directed away from said handle in horizontal alignment and normal to the handle axis when the harness is in its closely conforming contact with said head portion, (c) a pair of substantially identical holding collars adapted to fit around the handle in close conformity therewith and in engagement with said retaining shoulders, and (d) fastening means adapted to draw the holding collars tightly together in gripping contact with said shoulders.

In a preferred embodiment of the invention, the harness is fabricated of a piece of thin sheet metal shaped in a manner such that, when bent into a U-shape, it will seat upon the flat head extremity of the handle and extend downwardly therefrom in straddling engagement with the tapered surface of the head portion of the handle. The shoulders may be continuous integral extensions of the sheet metal, fabricated by punch-shaping methods, or the shoulders may be separate pieces adhered or otherwise fastened to the sheet metal. The height of the shoulders above the surface of the sheet metal is critically chosen so that the smaller diameter opening of the tapered socket of the pick head will pass over the shoulders when the harness is in place.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

FIG. 1 is a top plan view of an embodiment of a harness member of the device of this invention in its flattened state.

FIG. 2 is an end view of the harness of FIG. 1.

FIG. 2A is an end view of the harness of FIG. 1 in its bent state shown in association with other components of the device and pick.

FIG. 3 is an interior side view of an embodiment of a holding collar of the device of this invention.

FIG. 5 is a sectional view taken upon the line 5—5 of FIG. 4.

DESCRIPTION OF THE PREFERRED EMBODIMENT

Figure 4:
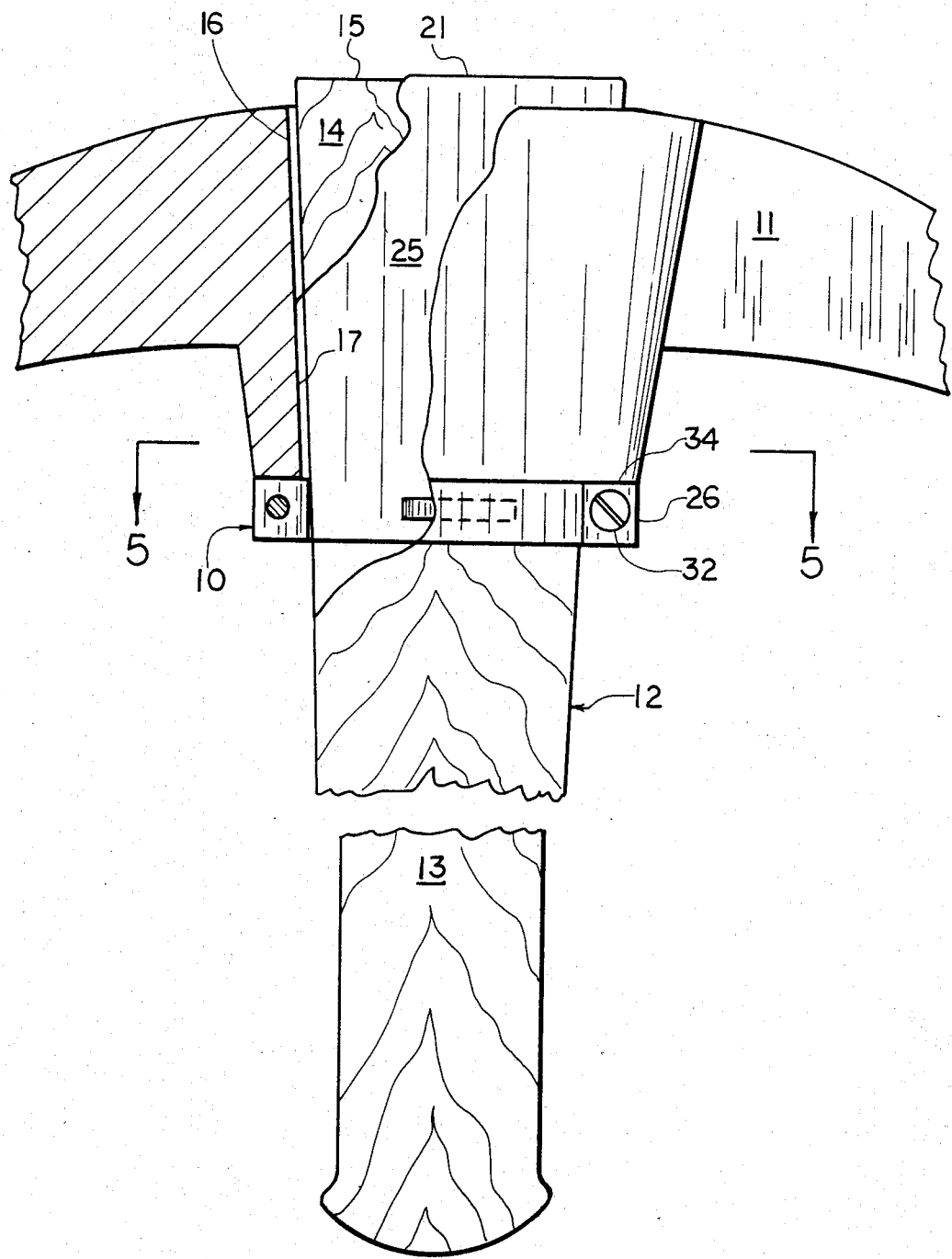
FIG. 4 is a side view illustrating the emplacement of the device upon a pick handle.

Referring to FIG. 4 of the drawing, a retainer device 10 of the present invention is shown in functional association with a pick comprised of pick head 11 and handle 12 having gripping portion 13 and outwardly tapered head portion 14 which terminates in flat extremity 15. The pick head is provided with a centered socket 16 having an interiorly tapered skirt 17. Attention is directed to the fact that the tapered head portion 14 will engage the interiorly tapered skirt 17 of the socket so that the pick head will be prevented from flying off the handle. The body of handle 12 is of a diameter small enough to permit its being projected through the reduced lower end of the socket. That is to say, when the handle is to be connected with the pick head, the lower portion of said handle is inserted downwardly through the socket so that the outwardly tapered head portion of the handle engages the socket. The retainer device 10 prevents pick head 11 from moving downward upon the handle.

Referring to FIGS. 1-3, the retainer device is shown comprised of an elongated harness 18 fabricated of a piece of thin sheet metal symmetrically contoured about short axis 19 and long axis 20, and having a central portion 21 and two longitudinal ears 25 having extremities 22. Associated with each longitudinal extremity on the same face of harness 18 is a retaining shoulder 23 having a contour which is elongated in a direction perpendicular to long axis 20. The illustrated shoulders are of rectangular shape and are separate pieces of uniform thickness attached by brazing to harness 18. In alternative embodiments, the shoulders may be embossed elevations of the sheet metal of harness 18, and may be of non-rectangular configuration.

When ready for use, the harness is placed atop the handle such that central portion 21 is directly above flat extremity 15 of the head portion of the handle with shoulders 23 upwardly directed. The ear portions 25 are then forced downwardly, as shown by the arrows in FIG. 2, causing folds along lines 24 which define the lateral boundaries of central portion 21, and causing the harness to have a U-shaped configuration as shown in FIG. 2A. The ears are capable of further bending around axis 20 to conform with the rounded curvature of the handle.

Each holding collar 26 is of arcuate curvature having a convex outer surface 27, a concave inner surface 28, and paired flat abutment extremities 29. The inner surface of the illustrated embodiment is provided with secondary retaining means in the form of recessed groove 30 having a size and configuration adapted to engage shoulder 23. In other embodiments, the secondary retaining means may be an upraised shoulder adapted to rest above shoulder 23 and in abutment therewith in the functional disposition of the device upon a pick handle. Each collar 26 is provided with a smooth bore channel 31 extending perpendicularly through one flat abutment extremity 29 and a threaded channel 35 extending perpendicularly through its opposite abutment extremity. When the two collars are engaged by bolts 32 extending through aligned channels 31 and 35, the collars define an interior opening 33 having the general shape of the handle.

The collars are attached to the facing bent extremities 22 of harness 18, as shown in FIGS. 2A and 4, in a manner such that shoulders 23 are engaged by grooves 30. Bolts 32 are then tightened, thereby causing the collars to tightly grip the harness and the handle. Pick head 11, previously slid onto the head portion of the handle so that its skirt embraces harness 18, is caused to be positioned in abutment with the upper extremities 34 of the collars. In such manner, the pick head cannot slide down the handle. It should be noted that the height of shoulders 23 is critical in that the height must be great enough to be functionally effective, yet small enough to permit passage of the lower end of the pick socket. In some erbodiments of the invention, the lower interior edge of socket 16 of the pick head may be provided with chamfers 36 to permit the socket to make close-fitting passage over shoulders 23. Said chamfers may either be pre-molded into the pick head, or may be individually formed in the pick head by use of a hand file.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A retainer device adapted to be associated with a pick head positioned upon the outwardly tapered head portion of a wooden pick handle, said device comprising:
   (a) an elongated thin bendable harness of integral monolithic construction having short and long axes of symmetry and two longitudinal extremities equally disposed about said short axis, said harness being adapted to lie in closely conforming contact with the head portion of a wooden pick handle in a manner such that said longitudinal extremities are in facing disposition on opposite sides of said handle,
   (b) retaining shoulders disposed upon the same surface of said harness adjacent said longitudinal extremities, whereby said shoulders are directed away from said wooden pick handle in horizontal alignment and normal to the handle axis when the harness is in its closely conforming contact with said head portion,
   (c) a pair of substantially identical holding collars adapted to fit around the handle in close conformity therewith and in engagement with said retaining shoulders, and
   (d) fastening means adapted to draw the holding collars tightly together in gripping contact with said shoulders, whereby
   (e) the pick head is caused to abut said holding collars.

2. The retainer device of claim 1 wherein said shoulders are separate pieces fastened to said harness.

3. The retainer device of claim 1 wherein each holding collar is of arcuate configuration, having a convex outer surface, concave inner surface, and paired flat abutment extremities.

4. The retainer device of claim 3 wherein the concave inner surface of each holding collar is provided with a recessed groove adapted to accommodate one of said retaining shoulders.

5. The retainer device of claim 4 wherein said holding collars are adapted to fit around the handle by means of bolts which threadably penetrate the abutment extremities of said collars.

6. The retainer device of claim 1 wherein said shoulders are elongated in a direction normal to said long axis of symmetry.

7. The retainer device of claim 6 wherein said shoulders have a rectangular contour.

* * * * *